Oct. 29, 1968      J. A. VAICHULIS      3,408,295
APPARATUS AND METHOD FOR DISINFECTING OR PURIFYING WATER
Filed Aug. 8, 1966
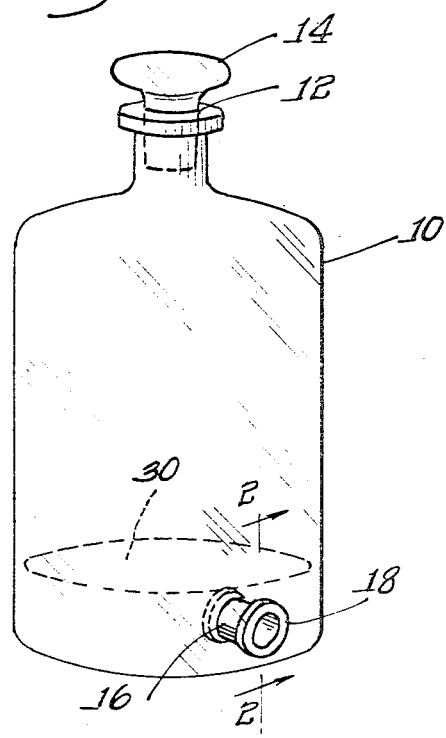
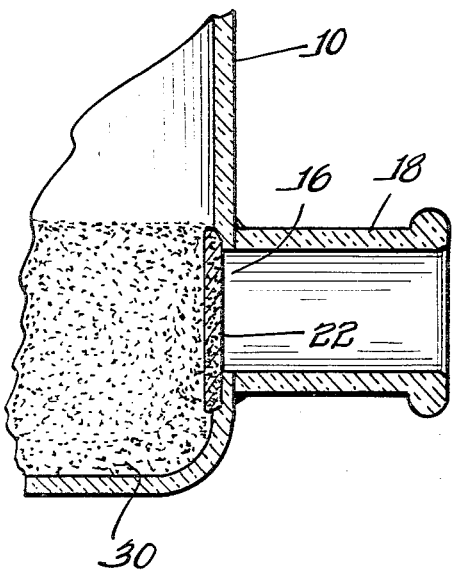
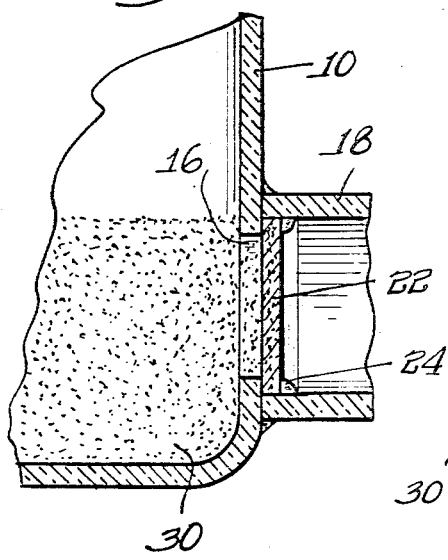
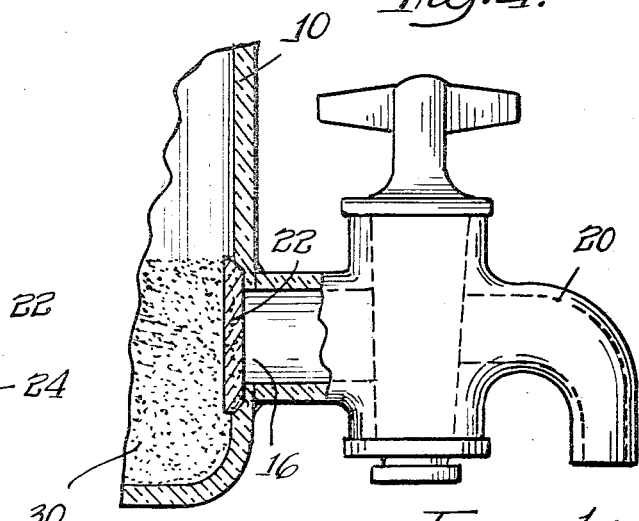
Inventor
John A. Vaichulis
By Wallenstein, Spangenberg, Hattis, Strampel attys 3,408,295
APPARATUS AND METHOD FOR DISINFECTING
OR PURIFYING WATER
John A. Vaichulis, 10455 S. Wabash Ave.,
Chicago, Ill. 60628
Filed Aug. 8, 1966, Ser. No. 570,815
10 Claims. (Cl. 210—62)

ABSTRACT OF THE DISCLOSURE

Apparatus for, and method of, purifying water utilizing elemental iodine. The apparatus advantageously comprises a portable container having an upper inlet for admitting impure water into the container and a lower outlet for purified water. The container is adapted to hold a quantity of elemental iodine sufficient in depth to overlie completely the outlet thereof. A porous body, which preferably is in the form of a fritted glass disc, is fixedly secured to the container at the outlet and below the impure water inlet thereof. The porous body is characterized by being inert with respect to iodine, and by having a porosity such that it is pervious to the passage of a water solution of iodine therethrough and impervious to the passage therethrough of iodine in undissolved form.

---

The present invention relates to apparatus for, and a method of, disinfecting or purifying (hereafter called "purifying") water utilizing iodine, particularly iodine in particulate or crystalline form, as the purifying agent in the production of said purified water.

The efficacy of iodine as a purifying agent for water is known. Apart from its excellent bactericidal, cysticidal and viricidal properties, iodine has a number of chemical properties which make it especially suitable for water purification purposes. One such property is its relative chemical inertness with respect to organic compounds of the type commonly present in impure water. This property of iodine is responsible, in the main, for its ability to persist longer in water to be purified and enables iodine to be used in comparatively low concentrations to attain the desired results. While the attributes of elemental iodine as a water purifying agent have been recognized, it has not made any appreciable inroads into the widespread use of chlorine as a water purifying agent. Because of certain problems in producing simply and inexpensively solutions of iodine in water, the potentials of elemental iodine as a water purifying agent have not been adequately exploited even in particular limited environments in which its use has been considered to be especially desirable. It is, therefore, an object of the present invention to provide means and procedures for the wider use of iodine for this purpose.

In accordance with one aspect of this invention, apparatus is provided for purifying water which can be adapted to certain domestic and other uses as well as for use in the field, including military use. The apparatus, while being of relatively simple construction, enables water to be purified safely and effectively in a short time. The apparatus is essentially unitary in construction and can withstand rough handling without any adverse effects on the results obtained with it. The concentration of elemental iodine in the purified water can be controlled with reasonable accuracy with the apparatus and the water solutions of iodine obtained therefrom can be employed to purify larger volumes of water.

In its preferred form, the apparatus of the present invention comprises a container having an inlet for admitting impure water into the container and an outlet for water which has been purified in the container. The container is provided with a quantity of elemental iodine crystals positioned between the inlet and outlet thereof. A porous body, especially desirably in the form of a fritted glass disc, is secured to the container at its outlet. The porous body is characterized in that it is inert with respect to the iodine and has a porosity such that it is pervious to the passage therethrough of a water solution of iodine but is impervious to the passage therethrough of the iodine in an undissolved form. The container advantageously is provided with a stopper for its inlet and desirably is provided with means at its outlet for controlling flow of water from the container.

In accordance with the method aspects of the present invention, impure water is admitted to a container having a substantially fixed bed of elemental iodine crystals therein. The water is allowed to pass through the bed of iodine crystals to enable it to dissolve a small portion of the iodine. The water, containing the dissolved iodine, is then passed through a porous body of the type described above and is ready for use. In the preferred practice of the method aspects of the invention, the water to be purified is maintained in contact with the bed of iodine crystals for a few minutes before it is passed through the porous body.

The above and other advantages and features of the present invention will become apparent upon making reference to the specification to follow, the claims, and the drawing wherein:

FIG. 1 is a view in perspective of an embodiment of the water purifying apparatus of the present invention;

FIG. 2 is an enlarged fragmentary sectional view taken substantially along line 2—2 of FIG. 1;

FIG. 3 is a view corresponding to the view of FIG. 2 showing the porous body secured at a different position with respect to the outlet of the apparatus, and FIG. 4 is an enlarged fragmentary view partly in section of another embodiment of the apparatus of the present invention having a stop-cock at the outlet thereof.

Referring now in greater detail to the drawings, the embodiment of the apparatus shown in FIG. 1 comprises a container 10 having an upper inlet 12, provided with a stopper 14, and a lower or bottom outlet 16. The container 10 desirably is transparent and advantageously is fabricated of a material which is resistant to chemical attack by iodine.

Secured to the outer wall of the container 10 at the outlet 16 thereof is an extension or spout 18 for draining purified water from the container. The spout 18 desirably is fused to the container and may take various forms. Thus, for example, it may be formed with an integral stock-cock 20, as shown in FIG. 4, for controlling flow from the container 10. In addition, the end of the spout can be formed into a ridged hose connector. The spout also may be formed with a ground glass inner wall for receiving a disconnectable stop-cock. Whatever form the spout takes, it advantageously should be capable, by itself, of controlling flow from the container 10, or should be capable of cooperating with means for achieving this end.

The container 10, at its outlet 16, is provided with a porous body 22. The body 22 most advantageously is permanently secured at the outlet 16 to prevent it from becoming dislodged due to rough handling of the container. In the embodiment of the invention illustrated in FIGS. 1 and 2, the porous body 22 is made a permanent and integral part of the container 10 by fusing the body, along its periphery, to the inner wall of the container at the outlet 16 thereof. In the embodiment shown in FIG. 3, this result is attained by providing one end of the spout 18 with an annular, inwardly extending shoulder 24, which engages the porous body 22, and securing, as by fusing, the end of the spout to the outer wall of the container 10. With this arrangement the body 22 is securely and immovably held in position, at the outlet 16, between the shoulder 24 and the outer wall of the container.

The porous body 22 is fabricated of a material which is resistant to attack by iodine and has a porosity such that it will enable water, containing iodine in dissolved form, to pass through it, but will prevent the passage therethrough of iodine in particulate form or undissolved form. While various materials can be used for this purpose, the objectives of the invention are most advantageously met by fabricating the porous body of such materials as fritted glass and glass wool. Of these materials, fritted glass is especially preferred. Fritted glass is available commercially in the form of thin discs, graded in accordance with their porosities, as extra-coarse, coarse, medium, fine and extra-fine. Fritted glass discs designated as "coarse" are particularly suitable for use in the water purifying apparatus of the present invention. Discs falling under this grade designation have pore sizes ranging from 40 to 60 microns and are provided with fused edges. These fused edges can be used to facilitate their fusion to the container 10. Slower flow-through rates can be achieved, if desired, by employing a fritted glass disc of medium grade. The pore sizes of such a disc range from 10 to 15 microns. In utilizing glass wool as the material for the porous body 22, it may be compacted and secured at the outlet 16 of the container in any manner known in the art. The invention, of course, contemplates the combined use of a fritted glass disc and glass wool, especially in those instances where a fritted glas disc of extra-coarse grade is used. Discs of this type have a pore size in the range of 170 to 220 microns.

Purification of water with the apparatus of this invention is attained by providing the container 10 with a layer or bed 30 of elemental iodine. The iodine employed can be either resublimed U.S.P. or reagent grade. This material is readily available on the market in these grades and its physical form can be either crystals or scales. The depth of the bed 30 formed with the elemental iodine, while variable, should always be of sufficient thickness to cover completely the outlet 16 of the container. Generally speaking, the bed 30 will range in depth, depending upon the location and diameter of the outlet 16, from about 1 inch to 2 inches.

In utilizing the apparatus of the present invention, the water to be purified is admitted into the container 10 through the inlet 12 thereof. Since iodine is only slightly soluble in water, ranging from 0.029 gram per 100 milliliters at 20° C. to 0.078 gram per 100 milliliters at 50° C., the water advantageously is retained in the container for a short period of time. This can be achieved by shutting off flow through the spout 18 with a stopper, for example, or by means of the stop-cock 20. Elemental iodine, in dissolved form, is effective as a water purifying agent in concentrations of only a few parts per million. Therefore, retention times of the order of 3 to 15 minutes, usually 5 to 10 minutes, at ambient temperatures, are adequate to enable a sufficient quantity of the iodine to go into solution. In those instances where water is retained in the container for longer periods to achieve higher iodine concentrations, the water from the container advantageously can be channelled or directed to a larger body of unpurified water to achieve purification. While this iodine concentration of the water from the container will be appreciably reduced in such cases, it will be sufficient in magnitude to attain the desired results.

The concentration of elemental iodine in water attained in accordance with the practice of the present invention will, of course, vary in relation, among other factors, to the length of time the water is retained in the container. Generally speaking, retention times of the range specified above will provide elemental iodine concentrations in the water of the order of about 2 to 12 milligrams, usually from about 5 to 8 milligrams, per liter of water.

It should be understood that various modifications in the specific embodiments of the invention disclosed and discussed will suggest themselves to those skilled in the art without departing from the scope of the invention, and that it is intended that the matter contained in the above description shall be interpreted as illustrative and not in a limiting sense.

What is claimed is:

1. Apparatus for purifying water comprising a container for water having an upper inlet for admitting impure water into the container and a lower outlet for purified water, said container being adapted to hold a quantity of elemental iodine crystals sufficient in depth to overlie completely the outlet thereof and a porous body fixedly secured at the outlet of the container and below the impure water inlet thereof, said body being characterized in that it is inert with respect to iodine or water solutions of iodine and has a porosity such that it is pervious to the passage of a water solution of iodine therethrough and impervious to the passage therethrough of iodine in undissolved form.

2. Apparatus as claimed in claim 1 wherein the porous body is formed of glass wool.

3. Apparatus as claimed in claim 1 wherein the porous body comprises a fritted glas disc which is fused in position below the impure water inlet of the container at the outlet thereof.

4. Apparatus as claimed in claim 3 wherein the fritted glass disc has a pore size in the range of 40 to 60 microns.

5. Apparatus as claimed in claim 1 wherein the container is provided with flow control means at the outlet thereof to enable impure water admitted to the container to be retained therein until a small portion of iodine has been dissolved by the water.

6. A method of purifying water comprising passing the water to be purified through an upper inlet of a container, having in the bottom part thereof a bed of elemental iodine, into contact with said bed of iodine to enable a small quantity of the iodine to be dissolved by the water, and passing the iodine-containing water through a fixedly secured porous body positioned below the impure water inlet of said container, said body being pervious to the passage therethrough of the iodine-containing water and impervious to the passage therethrough of iodine in undissolved form.

7. A method as claimed 6 wherein the water to be purified is retained in the container for a time sufficient to enable a small quantity of the iodine in the container to be dissolved.

8. A method as claimed in claim 7 wherein the water to be purified is retained in contact with the bed of iodine for a period of from 3 to 15 minutes.

9. A method as claimed in claim 6 wherein the water to be purified is maintained in contact with the bed of iodine until sufficient iodine has been dissolved by the water to provide a concentration of iodine therein of from 2 to 12 milligrams per liter of water.

10. A method as claimed in claim 9 wherein the water solution of iodine is brought into contact with a body of unpurified water which is not in contact with said bed of iodine, the concentration of iodine in said water solution being sufficient to purify said unpurified body of water.

References Cited

UNITED STATES PATENTS

| | | | |
|---|---|---|---|
| 731,615 | 6/1903 | Redlich | 23—272 |
| 2,286,828 | 6/1942 | Prizer | 23—272.7 |
| 3,307,914 | 3/1967 | Heiss et al. | 23—272 |

FOREIGN PATENTS 20,066   1912   Great Britain.

OTHER REFERENCES

Black, A. P., et al.: Use of Iodine for Disinfection, Jour. AWWA, November 1965, vol. 57, pp. 1401 through 1409 and 1418–1421, relied on.

MICHAEL E. ROGERS, *Primary Examiner.*